United States Patent Office 3,506,740
Patented Apr. 14, 1970

3,506,740
LOW MOLECULAR WEIGHT POLYOLEFINS AS INTERNAL LUBRICANTS FOR IMPACT POLYSTYRENE COMPOSITIONS
Lawrence T. Dempsey, Cherry Hill, N.J., and Lyndon R. Babcock, Jr., Elmhurst, N.Y., assignors, to Shell Oil Company, New York, N.Y., a corporation of Delaware
No Drawing. Continuation-in-part of application Ser. No. 509,604, Nov. 24, 1965. This application Oct. 12, 1966, Ser. No. 586,017
Int. Cl. C08f 33/08
U.S. Cl. 260—876                                    4 Claims

ABSTRACT OF THE DISCLOSURE

The elongation, viscosity and other flow characteristics of high impact polystyrene and ABS resins are improved with only minor effect on heat distortion and other mechanical properties by blending with the resin from 1–5 parts of an amorphous, atactic low molecular weight polyolefin selected from polypropylene and polybutylene. The polyolefin may be added during any stage of the manufacture and processing of the high impact resin.

---

This application is a continuation-in-part of our copending application Ser. No. 509,604, filed Nov. 24, 1965, now abandoned.

This invention relates to molding compositions comprising polyvinyl aromatic compounds. More particularly, this invention relates to the use of certain polyolefins as internal lubricants in high impact polystyrene molding compositions.

It is known that polyvinyl aromatic compounds such as polystyrene have improved properties of toughness when a small amount of a rubbery polymer is incorporated therewith. These rubber-modified compounds are resistant to breakage under impact and are consequently useful in making molded articles. High impact polystyrene is obtained, for example, by polymerizing a solution in styrene of a minor amount, 1 to 15 parts by weight per hundred parts of styrene, of an unsaturated rubbery polymer of a conjugated diolefin, e.g., polybutadiene or a copolymer of styrene and butadiene. While high impact polystyrene possesses good mechanical properties, such as impact strength, hardness, heat distortion temperature, other mechanical properties such as elongation and temperature-viscosity relationships, are less than desirable for molding operations. These latter properties affect the rheological behavior of the product, and accordingly its processability. It is known that certain additives, known as lubricants, can be introduced into high impact polystyrene in order to give the desired properties of flow, prevent sticking to the mold and the like. These additives, however, have a detrimental effect on other mechanical properties.

Accordingly, it is a primary object of the present invention to provide lubricants for polyvinyl aromatic molding compositions such as high impact polystyrene which impart good processability thereto and at the same time have only a slight effect on other mechanical properties. Another object of the invention is to provide lubricants for high impact polystyrene which in addition to possessing the desired flow and strength properties may be easily and conveniently added thereto during any stage of the processing of the high impact polystyrene. It is still another object of the invention to provide lubricants for high impact polystyrene which do not interfere with the polymerization reaction, which are available at reasonable costs; have sufficiently high boiling points so as to avoid losses during processing; and have acceptable color and heat stability. These and other objectives and advantages of the invention will be apparent from the following detailed description thereof.

It has now been found that these and other objectives are accomplished by incorporating as a lubricant into polyvinyl aromatic molding compositions an amorphous, atactic, low molecular weight polyolefin selected from either polypropylene or polybutylene.

In its broad aspect, the present invention embraces molding compositions of vinyl aromatic resins which are solid polymers and copolymers of monovinyl aromatic compounds having the vinyl group attached to a carbon atom of the aromatic nucleus substituted with one or more groups such as methyl, ethyl and chloro groups. However, the preferred polyvinyl aromatic resins utilize styrene as the vinyl aromatic constituent. In addition to the vinyl aromatic constituent, the molding compositions of the present invention also contain a rubbery polymer in order to improve the properties of toughness. Examples of such rubber polymers include polybutadiene, polyisoprene, copolymers of butadiene and styrene and copolymers of butadiene and acrylonitrile. The preferred rubber polymers suitable for this invention consist essentially of polybutadiene or styrene and butadiene copolymers. The term resin has reference to the polyvinyl aromatic composition including any rubbery copolymer contained therein.

The invention is also applicable to the class of heterophase terpolymers known as ABS resins. The ABS resins contain copolymerized acrylonitrile in the polystyrene component and also in the rubber component of the polymer.

The relative proportions of polyvinyl aromatic material and rubbery polymer should be within the range of from about 85 to 98 parts by weight of polyvinyl aromatic materials and from about 2 to about 15 parts by weight of rubbery polymer.

The amount of lubricant incorporated into molding compositions will vary with the particular molding composition and the properties desired. Generally, this amount will range from about 1 part to about 5 parts of lubricant per 100 parts by weight of composition, although lesser or greater amounts can be used, if desired.

Polypropylenes which are useful as lubricants in accordance with the present invention have an average molecular weight of from about 800 to about 1400, and preferably from 900 to 1300, as measured by vapor pressure osmetry. Polybutylenes which are useful as lubricants in the present invention have an average molecular weight of from about 800 to about 1600, and preferably from 900 to 1500. In using generic terminology to describe these lubricants, of course, all isomers are intended.

Although the exact scientific basis for the favorable effects of the above-described lubricants on the behavior of high impact polystyrene, i.e., modifying the rheological behavior thereof with only a slight effect on other mechanical properties is not known, it is believed to be attributed to its incompatibility with both the dispersed rubber phase and the polystyrene matrix thereof. By "incompatibility" is meant that there is no chemical or physical reaction involved between the lubricant and the components of the high impact polystyrene resin. Consequently, the lubricants of this invention can be physically blended into finished high impact polystyrene, added to the feed, or added at any point in the polymerization process where they can be mixed therewith effectively. Moreover, the lubricants of this invention possess acceptable color and heat stability and have sufficiently high boiling points to avoid losses during processing of the resulting high impact polystyrene compositions, and further are commercially available at a reasonable cost.

The lubricants of the present invention are sharply distinguished from prior lubricants for polyvinyl aromatic compositions in that they are incompatible therewith, whereas the conventional lubricants are compatible with the compositions. As suggested hereinbefore it is believed that it is the incompatibility of the lubricants which impart good flow and elongation properties to high impact polystyrene with only a slight effect on other mechanical properties.

To more fully illustrate and describe the invention the following example is given. For purposes of illustration high impact polystyrene is used as the molding composition. It is understood, however, that the invention is not limited thereto, and that other polyvinyl aromatic compositions are also suitable.

EXAMPLE

A high impact composition was prepared by heating styrene containing in solution 6 parts by weight of polybutadiene rubber and 2 parts by weight of a styrene-butadiene block polymer for 15 hours at 105° C. and for 8 hours at temperatures increasing from 145° C. to 190° C. to effect polymerization of the styrene. The polybutadiene rubber and the block polymer were manufactured by solution polymerization using a butyl lithium catalyst.

Three parts of "Amopol Polypropene C–175" per hundred parts of composition were added to and thoroughly mixed with half of the composition. "Amopol Polypropene 175–C" is a commercially available amorphous, atactic polypropylene having an average molecular weight of about 1120; a viscosity of 14,500 centistokes at 100° F. and 175 centistokes at 210° F.; flash point (C.O.C.) of 450° F.; a specific gravity of 0.865 (60/60° F.); a refractive index ($N20/D$) of 1.4766; a pour point at 30° F.; an A.S.T.M. color of <0.5; and has a chloride content of about 0.04%.

Three parts of "Indopol Polybutene H–100" per hundred parts of composition were added to and thoroughly mixed with the remaining half of the composition. "Indopol Polybutene H–100" is a commercially available amorphous, atactic polybutylene having an average molecular weight of about 920; a viscosity of 7760 centistokes (36,000 SSU) at 100° F. and 215 centistokes (985,554) at 210° F.; flash point (C.O.C.) of 395° F.; a specific gravity of 0.8899 (60/60° F.); a refractive index of 1.4941 ($N20/D$); and a pour point of 20° F.

Three additional high impact polystyrene compositions were prepared following the foregoing procedure with the exception that in place of using the above lubricants, one composition contained no lubricant, another composition contained 3% by weight of n-butyl stearate, and the third composition contained 3% by weight of Ondina® 935. Ondina® 935 is a composition consisting of 65% paraffinic, 35 naphthenic mineral oil.

Various tests were performed on the five compositions to determine the effect of the polypropylene lubricant and to compare it to other known lubricants. The results of the tests are given in the table.

TABLE—PROPERTIES OF HIGH IMPACT POLYSTYRENE CONTAINING VARIOUS INTERNAL LUBRICANTS

| | None (control) | n-Butyl stearate | Ondina® 935 65% paraffinic, 35% naphthenic mineral oil | Polypropene Amorphous atactic | Polybutylene Amorphous atactic |
|---|---|---|---|---|---|
| Lubricant Added (3% w.) | | | | | |
| Lubricant Type | | Fatty acid ester | | | |
| MW Lubricant | | 341 | 400 (Approx.) | 1,120 | 920 |
| Physical properties: | | | | | |
| Yield tensile strength, p.s.i. | 4,920 | 3,660 | 3,940 | 4,630 | 4,540 |
| Ultimate tensile strength, p.s.i. | 4,620 | 3,550 | 3,880 | 4,250 | 4,200 |
| Elongation, percent | 14 | 32 | 33 | 38 | 43 |
| Hardness, Rockwell M | 36 | 51 | 33 | 31 | 32 |
| Heat distortion temp., °F | 194 | 178 | 187 | 192 | 196 |
| Rheological Data: | | | | | |
| Brabender Parameters, 200° C., 100 r.p.m. (low peak torque and low 4-minute viscosity indicate good processability). | | | | | |
| Peak torque, kg.-m. | 4.90 | 4.08 | 4.46 | 4.18 | 4.44 |
| Initial slope, kg.-m./sec. | 0.087 | 0.057 | 0.069 | 0.069 | 0.107 |
| 2-minute viscosity, kg.-m. | 1.68 | 1.38 | 1.55 | 1.54 | 1.59 |
| 4-minute viscosity, kg.-m. | 1.37 | 1.15 | 1.26 | 1.28 | 1.25 |

From the table it can be seen that the polypropylene and polybutylene lubricants of the present invention improve the elongation, and flow (viscosity and peak torque) properties of high impact polystyrene with only a slight effect on heat distortion temperature and other mechanical properties. Flow properties and the heat distortion temperature are of considerable importance when processing molding compositions such as high impact polystyrene. Elongation relates to the extent to which a plastic sample, when opposing forces are applied to opposite ends thereof, will elongate prior to break. This latter property is obviously desirable in molded plastic articles.

We claim as our invention:

1. A method for preparing a moldable composition which comprises blending from 1 to 5 parts by weight of an amorphous, atactic polybutylene having a molecular weight of from about 900 to about 1500 with 100 parts by weight of a polymer composition which is the mass thermal polymerization product of 85 to 98 parts by weight of styrene containing in solution 2 to 15 parts by weight of a polymer of a conjugated diolefin.

2. A process as in claim 1 wherein the conjugated diolefin is butadiene.

3. A moldable composition comprising the mass thermal polymerization product of 85 to 98 parts by weight of styrene containing in solution 2 to 15 parts by weight of a polymer of a conjugated diolefin and having mixed therewith from 1 to 5 parts by weight of an amorphous, atactic polybutylene having a molecular weight of from about 900 to 1500.

4. A composition as in claim 3 wherein the conjugated diolefin is butadiene.

References Cited

UNITED STATES PATENTS

| | | | |
|---|---|---|---|
| 2,202,363 | 5/1940 | Wiezevich. | |
| 3,177,168 | 4/1965 | Lunk et al. | 260—28.5 |
| 3,210,301 | 10/1965 | White | 260—4 |
| 3,224,984 | 12/1965 | Roper et al. | 260—2.5 |
| 3,311,675 | 3/1967 | Doak et al. | 260—880 |
| 3,375,302 | 3/1968 | Iwai et al. | 260—876 |
| 2,994,679 | 8/1961 | Jones et al. | 260—33.6 |

SAMUEL H. BLECH, Primary Examiner

K. E. KUFFNER, Assistant Examiner

U.S. Cl. X.R.

260—28.5, 33.6, 889, 892